United States Patent
Guo et al.

(10) Patent No.: US 12,464,612 B2
(45) Date of Patent: Nov. 4, 2025

(54) CONTROLLER FOR BATHTUB LAMP

(71) Applicant: Guangzhou Rising Dragon Recreation Industrial Co., Ltd., Guangzhou (CN)

(72) Inventors: Ziqin Guo, Guangzhou (CN); Bo Liang, Guangzhou (CN)

(73) Assignee: Guangzhou Rising Dragon Recreation Industrial Co., Ltd., Guangzhou (CN)

( * ) Notice: Subject to any disclaimer, the term of this patent is extended or adjusted under 35 U.S.C. 154(b) by 90 days.

(21) Appl. No.: 18/590,974

(22) Filed: Feb. 29, 2024

(65) Prior Publication Data
US 2025/0142693 A1 May 1, 2025

(30) Foreign Application Priority Data
Oct. 27, 2023 (CN) .......................... 202322891979.3

(51) Int. Cl.
*H05B 45/10* (2020.01)
(52) U.S. Cl.
CPC ................... *H05B 45/10* (2020.01)
(58) Field of Classification Search
CPC ......... H05B 45/10; H05B 45/37; H05B 47/10
See application file for complete search history.

(56) References Cited

U.S. PATENT DOCUMENTS

2019/0387590 A1* 12/2019 Hierzer .................. H05B 45/10
* cited by examiner

*Primary Examiner* — Monica C King
(74) *Attorney, Agent, or Firm* — Frank Niranjan

(57) ABSTRACT

A controller for a bathtub lamp comprises an MCU module, an R2R network module, a DCDC module and an LED module which are electrically connected in sequence; the MCU chip is used for generating variable digital signals corresponding to different brightness levels required in different modes and generating, according to values of the digital signals corresponding to different brightness levels, binary codes which are parallelly output to control the on-off state of resistor pairs in corresponding R2R networks to adjust DCDC circuits to drive an output voltage of the LED module, and stepless change of the output voltage is realized by means of output capacitors of the DCDC circuits, such that light brightness changes more smoothly and continuously, output light is softer, and the technical problem of eye strain caused by harsh light resulting from the low frequency of most existing PWM signals and large dimming fluctuations is solved.

8 Claims, 4 Drawing Sheets

CONTROLLER FOR BATHTUB LAMP

FIELD

The application relates to the field of lamp control, and particularly relates to a controller for a bathtub lamp.

BACKGROUND

In existing LED light systems for bathtub lamps, the colour change of LED lamps is generally controlled by a pulse width modulation (PWM) signal, corresponding to the brightness, generated by a controller. Because LED lamps are distributed at different positions of a bathtub, the transmission circuit is long, and the PWM signal transmission load is large.

Because the PWM signal is a signal formed by a rectangular pulse sequence, in a PWM dimming mode, a pixel light source will quickly light up to the maximum brightness when the PWM signal changes from a low level to a high level and will dim quickly when the PWM signal changes from a high level to a low level, thus leading to eye strain in the PWM dimming mode both under bright light and weak light. Moreover, the frequency of most PWM signals is from tens of HZ to hundreds of HZ. When the PWM frequency is low, brightness of LEDs will change obviously, leading to eye irritation and eye strains. In view of this, high-frequency PWM signals are often used to solve this problem. However, according to the GB/T31831-2015 standard, when the frequency ranges from 9 Hz to 3125 Hz, the fluctuation depth will be greater than fx0.08/2.5% (f is frequency), which may do harm to human bodies. As can be seen from this, when the PWM frequency is high, the PWM dimming fluctuation will be close to or even exceed 100%, and harsh light will be generated, leading to eye strain and severe irritation and harm to eyes.

SUMMARY

In view of the technical problem of eye strain caused by harsh light resulting from the low frequency of most PWM signals or large PWM dimming fluctuations in the prior art, the application provides a controller for a bathtub lamp.

A controller for a bathtub lamp, comprising an MCU module, an R2R network module, a DCDC module and an LED module which are electrically connected in sequence;
  the MCU module comprises an MCU chip; the R2R network module comprises a plurality of R2R networks, and the DCDC module comprises a plurality of DCDC circuits; input terminals of the R2R networks are electrically connected to the MCU chip, and output terminals of the R2R networks are electrically connected to feedback terminals of the corresponding DCDC circuits respectively; output terminals of the DCDC circuits are all electrically connected to the LED module;
  the MCU chip is used for generating digital signals corresponding to different brightness levels and generating, according to values of the digital signals corresponding to different brightness levels, binary codes which are output parallelly to control an on-off state of resistor pairs in the corresponding R2R networks, and adjusting the DCDC circuits to drive an output voltage of the LED module, and stepless change of the output voltage is realized by means of capacitors of the DCDC circuits.

Preferably, wherein the R2R network comprises a plurality of resistors, and each said resistor has a terminal connected in parallel to the MCU chip as well as a terminal connected to the feedback terminal of the corresponding DCDC circuit.

Preferably, wherein the DCDC circuit comprises a DCDC chip, a resistor A, a capacitor C, a resistor B, a Schottky diode and an inductor; the resistor A is connected to an enable pin EN of the DCDC chip and is connected to an external power supply after being connected to a drive pin VIN; the inductor is connected to a switch pin SW of the DCDC chip and leads out a voltage output terminal VOUT; one terminal of the capacitor is connected in parallel to the voltage output terminal VOUT, and the other terminal of the capacitor is grounded; an anode of the Schottky diode is connected to a power ground, and a cathode of the Schottky diode is connected in parallel between the switch pin SW and the inductor; the capacitor C is connected between the pin VIN and a pin GND of the DCDC chip and is grounded; and the resistor B is connected to the capacitor and is connected to the output terminal of the corresponding R2R network after being connected to a pin FB of the DCDC chip.

Preferably, wherein the LED module comprises a drive chip and an LED unit electrically connected to the drive chip, an OUTR pin, an OUTG pin and an OUTB pin are arranged on the drive chip, the LED unit comprises an R-LED, a G-LED and a B-LED which are respectively connected to the OUTR pin, the OUTG pin and the OUTB pin.

Preferably, wherein the R2R network module comprises three R2R networks, the DCDC module comprises three DCDC circuits, and the three DCDC circuits are connected to the R-LED, the G-LED and the B-LED through the OUTR pin, the OUTG pin and the OUTB pin respectively; the input terminals of the three R2R networks are electrically connected to the MCU chip, and the output terminals of the three R2R networks are electrically connected to the feedback terminals of the DCDC circuits respectively; the MCU chip outputs three digital signal R, G and B corresponding to different brightness levels to respectively control the on-off state of the resistor pairs in the corresponding R2R networks to correspondingly adjust voltages output to the OUTR pin, the OUTG pin and the OUTB pin by the DCDC circuits connected to the R2R networks.

Preferably, wherein when the R2R network is configured to output 0, the voltage output by the corresponding DCDC circuit is lower than a turn-on voltage of the R-LED, the G-LED or the B-LED connected to the DCDC circuit; when the R2R network is configured to output 1, the voltage output by the corresponding DCDC circuit is greater than the turn-on voltage of the R-LED, the G-LED or the B-LED connected to the DCDC circuit; and when the R2R network is configured to output 2 to N, voltages are superposed correspondingly to be output, wherein N is the number of bits of the R2R network.

Preferably, wherein a voltage stabilizer for providing a +5 V operating voltage for the MCU chip is connected to a pin VDD of the MCU chip.

Preferably, wherein a pin VCAP of the MCU chip is connected to a capacitor C2 and is grounded after being connected to a pin VSS.

The application has the following beneficial effects: the application provides a controller for a bathtub lamp, comprising an MCU module, an R2R network module, a DCDC module and an LED module which are electrically connected in sequence; the MCU chip is used for generating variable digital signals corresponding to different brightness levels required in different modes and generating, according to values of the digital signals corresponding to different brightness levels, binary codes which are parallelly output to control the on-off state of resistor pairs in corresponding R2R networks to adjust DCDC circuits to drive an output voltage of the LED module, and stepless change of the output voltage is realized by means of output capacitors of the DCDC circuits, such that light brightness changes more smoothly and continuously, output light is softer, and the technical problem of eye strain caused by harsh light resulting from the low frequency of most existing PWM signals and large dimming fluctuations is solved.

REFERENCE SIGNS

1, MCU module; 11, MCU chip; 2, R2R network module; 21, R2R network; 3, DCDC module; 31, DCDC circuit; 32, DCDC chip; 4, LED module.

DESCRIPTION OF THE EMBODIMENTS

The application will be further described below in conjunction with accompanying drawings and specific implementations. It should be noted that the embodiments or technical features in the following description can be combined freely without conflicts to form new embodiments.

The following description is used for disclosing the application to allow those skilled in the art to implement the application. Preferred embodiments in the following description are merely examples, and those skilled in the art can think out other obvious transformations. The basic principle of the application defined by the following description can be applied to other implementations, transformations, improvements, equivalents and technical solutions without departing from the spirit and scope of the application.

Figure 1:
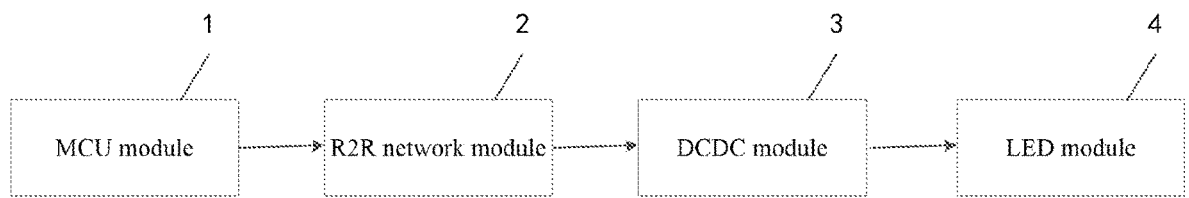
FIG. 1 is a schematic diagram of a controller for a bathtub lamp according to the application.

Referring to FIG. 1, a controller for a bathtub lamp comprises a Microcontroller Unit (MCU) module 1, a Resistor to Resistor (R2R) network module 2, a Direct Current to Direct Current (DCDC) module 3 and a light-emitting diode (LED) module 4 which are electrically connected in sequence.

Figure 2:
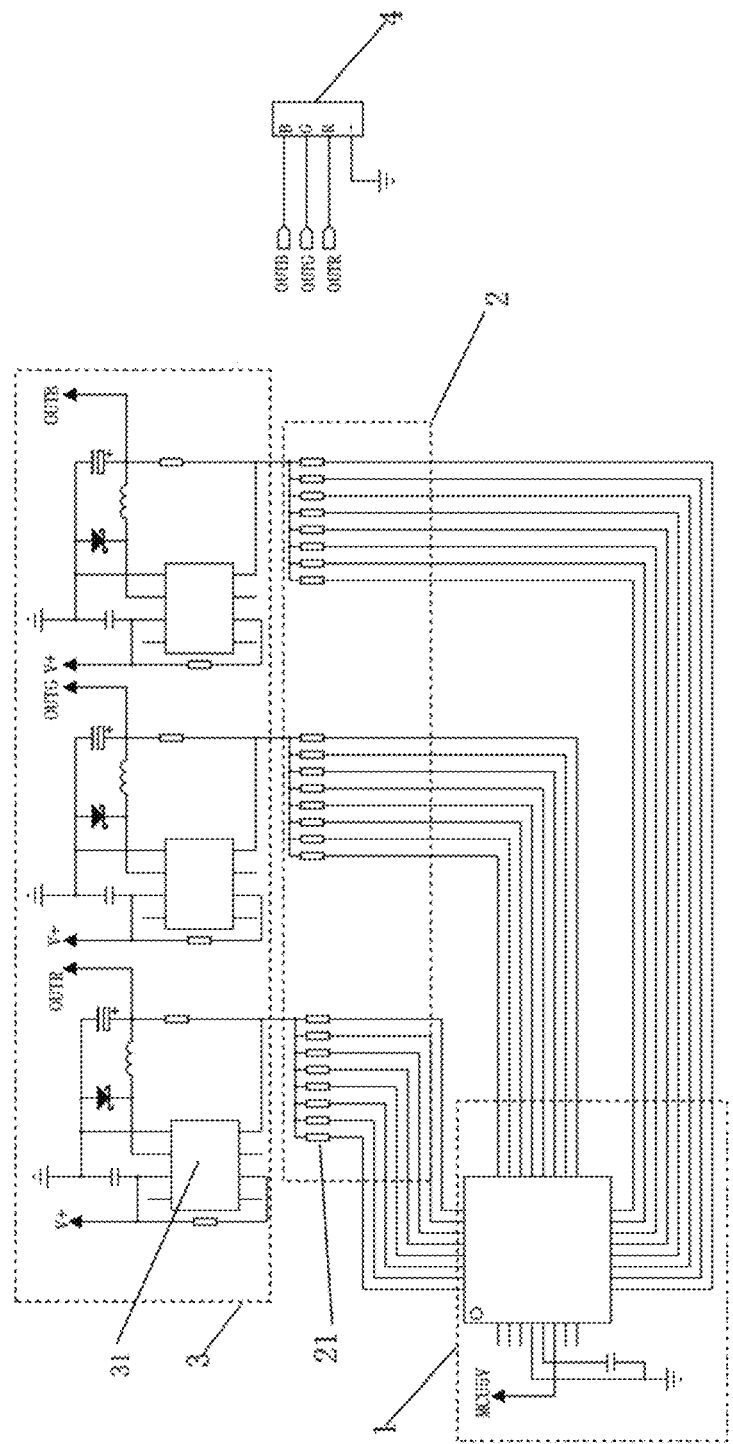
FIG. 2 is a circuit structure diagram of the controller for a bathtub according to the application.
Figure 3:
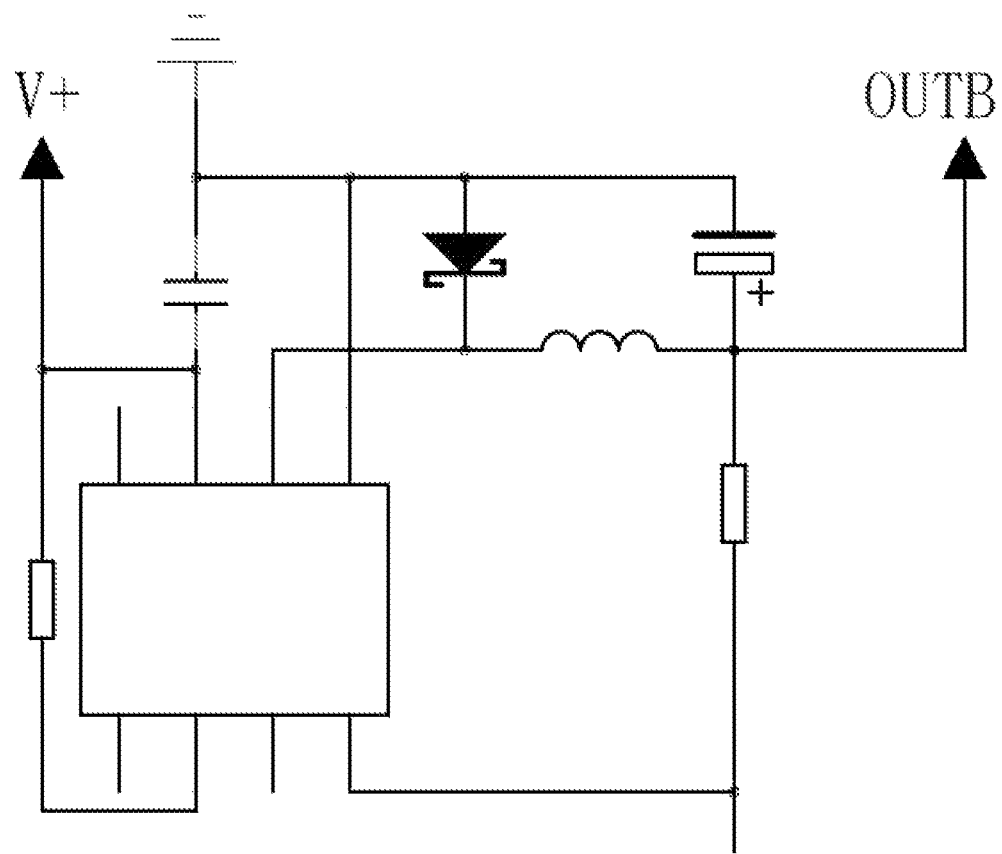
FIG. 3 is a schematic diagram of a DCDC circuit according to the application.

Specifically, referring to FIG. 2, the MCU module 1 comprises an MCU chip 11; the R2R network module 2 comprises a plurality of R2R networks, and the DCDC module comprises a plurality of DCDC circuits; input terminals of the R2R networks are electrically connected to the MCU chip respectively, and output terminals of the R2R networks are electrically connected to feedback terminals of the corresponding DCDC circuits respectively; and output terminals of the DCDC circuits are all electrically connected to the LED module.

Wherein, the MCU chip 11 is used for generating variable digital signals corresponding to different brightness levels required in different modes in use and generating, according to values of the digital signals corresponding to different brightness levels, binary codes which are parallelly output to control the on-off state of resistor pairs in the corresponding R2R networks 21 to adjust resistances accessed to the DCDC circuits, so as to adjust the DCDC circuits 31 correspondingly connected to the output terminals of the R2R networks 21 to drive an output voltage of the LED module to change to a corresponding level, thus changing a mean value of the output voltage; and the output voltage is smoothed by capacitors of the DCDC circuits 31 to restrain voltage ripples and noise, thus realizing stepless change of the output voltage. When the output voltage changes slightly at an appropriate rate, light emitted by the LED module 4 will be softer, thus avoiding eye irritation or eye strain. The light brightness changes more smoothly and continuously to further reduce irritation to eyes, thus avoiding eye strain.

When the brightness level of light is X %, the MCU chip 11 converts a value representing the brightness level X % into a corresponding binary code and parallelly outputs the binary code to the R2R networks 21 to control the on-off state of each resistor pair in the R2R networks 21. For example, for a 8-bit R2R network, the MCU chip 11 will generate a 8-bit binary code corresponding to the brightness level X %, such as 00000000 or 00000001, which correspondingly and respectively control the on-off state of 8 resistor pairs, wherein 0 represents "off", and 1 represents "on"; resistors in the on-state will be connected in parallel to form an equivalent resistor which is connected to the corresponding DCDC circuit 31, and the other resistors will be turned off, such that the resistance accessed into the DCDC circuit 31 is, thus changing the output voltage of the DCDC circuit 31. Under the condition that the brightness level of light remains unchanged, the output voltage of the DCDC circuit 31 will remain unchanged.

When the brightness level of light increases from X % to Y %, the MCU chip 11 will generate a corresponding new binary code to change the on-off state of each resistor pair in the corresponding R2R network, the resistance accessed to the DCDC circuit 31 will be adjusted to a resistance corresponding to the brightness level Y % to further adjust the DCDC circuit 31, correspondingly connected to the output terminal of the R2R network 21, to drive the output voltage of the LED module to change to the corresponding level, thus changing the mean value of the output voltages; the output voltage is smoothed by a capacitor of the DCDC circuit 31 to restrain voltage ripples and noise, and at this moment, the output voltage will increase smoothly. In this way, stepless change of the output voltage is realized to reduce dimming fluctuations generated during brightness adjustment, such that light emitted by the LED module 4 is softer and will not cause eye irritation or strain to users.

Wherein, a voltage stabilizer for providing a +5V operating voltage for the MCU chip is connected to a pin Voltage Drain Drain (VDD) of the MCU chip 11.

A pin Voltage Capacitor Pin (VCAP) of the MCU chip 11 is connected to a capacitor C2 and is grounded after being connected to a pin Voltage Source Ground (VSS). In this way, power noise can be filtered out to provide a stable mains voltage, thus protecting the MCU chip from being affected by mains fluctuations.

The R2R network 21 comprises a plurality of resistors, one terminal of each resistor is connected in parallel to the MCU chip 11, and the other terminal of each resistor is connected to the feedback terminal of the corresponding DCDC circuit.

The DCDC circuit 31 comprises a DCDC chip 32, a resistor A, a capacitor C, a resistor B, a Schottky diode and an inductor; the resistor A is connected to an enable pin EN of the DCDC chip 32 and is connected to an external power supply after being connected to a drive pin VIN; the inductor is connected to a switch pin SW of the DCDC chip 32 and leads out an output terminal VOUT; one terminal of the capacitor is connected in parallel to the output terminal VOUT, and the other terminal of the capacitor is grounded; an anode of the Schottky diode is connected to a power ground, and a cathode of the Schottky diode is connected in parallel between the switch pin SW and the inductor; the capacitor C is connected between the pin VIN and a pin GND of the DCDC chip 32 and is grounded; and the resistor B is connected to the capacitor and is connected to the output terminal of the corresponding R2R network 21 after being connected to a pin FB of the DCDC chip 32.

Figure 4:
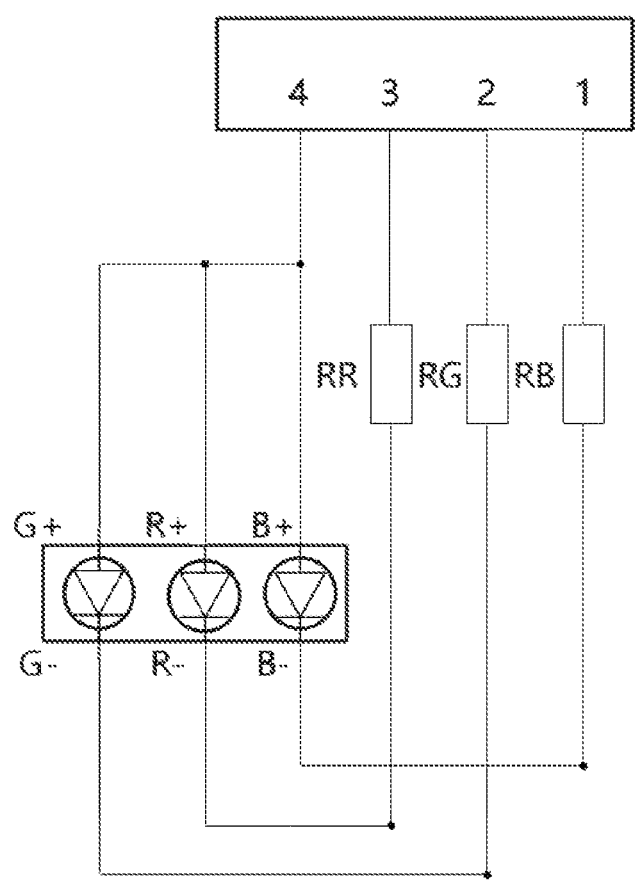
FIG. 4 is an internal circuit structure diagram of an LED unit according to the application.

Referring to FIG. 1 and FIG. 4, in this embodiment, the LED module comprises a drive chip and an LED unit electrically connected to the drive chip, and an OUTR pin for controlling the output of a red light source, an OUTG pin for controlling the output of a green light source and an OUTB pin for controlling the output of a blue light source are arranged on the drive chip. The LED unit comprises a red light-emitting diode R-LED, a green light-emitting diode G-LED and a blue light-emitting diode B-LED which are connected to the OUTR pin, the OUTG pin and the OUTB pin respectively. The OUTR pin, the OUTG pin and the OUTB pin receive converted output voltages and corresponding digital signals from the DCDC circuits to drive R-LED, G-LED and B-LED to emit light of corresponding brightness levels, respectively.

The R2R network module 2 comprises three R2R networks 21, the DCDC module 3 comprises three DCDC circuits 31, and the three DCDC circuits 31 are connected to R-LED, G-LED and B-LED through the OUTR pin, the OUTG pin and the OUTB pin respectively; input terminals of the three R2R networks 21 are electrically connected to the MCU chip 11, and output terminals of the three R2R networks 21 are electrically connected to feedback terminals of the corresponding DCDC circuits 31 respectively; the MCU chip 11 outputs three digital signals R, G and B corresponding to different brightness levels to control the on-off state of resistor pairs in the corresponding R2R networks 21 respectively to adjust voltages output by the corresponding DCDC circuits 31 to the OUTR pin, the OUTG pin and the OUTB pin to the corresponding levels, and the output voltage is smoothed by capacitors of the DCDC circuits 31 to restrain voltage ripples and noise, thus realizing stepless change of the output voltage.

Specifically, when the R2R network is configured to output 0, the output voltage of the DCDC circuit is lower than a turn-on voltage of the R-LED, G-LED or B-LED connected to the DCDC circuit; when the R2R network is configured to output 1, the output voltage of the DCDC circuit is greater than the turn-on voltage of the R-LED, G-LED or B-LED connected to the DCDC circuit; and when the R2R network is configured to output 2 to N, voltages are superposed correspondingly to be output, wherein N is the number of bits of the R2R network 21.

Wherein, the turn-on voltage refers to a minimum voltage that needs to be applied to the LED pin to turn on the LED to emit light. When the R2R network 21 outputs 0, it corresponds to a case where all bits of the R2R network 21 are 0, indicating that all the resistor pairs are turned off; and in this case, the voltage output by the DCDC circuit is lower than the turn-on voltage of the LED, and the LED will not light up. When the R2R network outputs 1, in corresponds to a case where the lowest bit of the R2R network 21 is 1 and the other bits of the R2R network 21 are 0, indicating that the resistor pair corresponding to the lowest bit is turned on and the resistor pairs corresponding to the other bits are turned off; and in this case, the voltage output by the DCDC circuit 31 is exactly greater than the turn-on voltage of the LED, and the LED will light up. When the R2R network 21 outputs 2 to N, it corresponds to a state represented by a binary code formed by the bits of the R2R network 21, and the on-off state of the resistor pairs will be controlled according to the binary code formed by the output values to turn on resistor pairs 1 to (N−1); and in this case, the resistances of the resistor pairs in the on-state will be connected in parallel to enable the DCDC circuit 31 to output a corresponding voltage. The brightness of the LED will increase with the increase of the voltage and will decrease with the decrease of the voltage.

In addition, LEDs of different colours may have different turn-on voltages, so initial voltages output by the DCDC circuits connected to the R-LED, the G-LED and the B-LED are different and need to be set according to the colours of the LEDs to ensure that the voltages output by the DCDC circuits can reach the turn-on voltages of the LEDs when the R2R networks 21 output 1.

According to the controller for a bathtub lamp provided by the application, the MCU chip 11 is used for generating variable digital signals corresponding to different brightness levels required in different modes in use and generating, according to values of the digital signals corresponding to different brightness levels, binary codes which are parallelly output to control the on-off state of the resistor pairs in the corresponding R2R networks 21 to adjust the DCDC circuits to drive an output voltage of the LED module, and stepless change of the output voltage is realized by means of output capacitors of the DCDC circuits, such that light brightness changes more smoothly and continuously, output light is softer, and the technical problem of eye strain caused by harsh light resulting from the low frequency of most existing PWM signals and large dimming fluctuations is solved.

Those skilled in the art should understood that the embodiments of the application described above and shown in the drawings are merely illustrative ones, and are not intended to limit the application. The purpose of the application has been completely and effectively fulfilled. Although the functions and structural principle of the application have been illustrated and described in the above embodiments, any transformations or amendments of the implementations of the application will be available without departing from the principle of the application.

What is claimed is:

1. A controller for a bathtub lamp, comprising an MCU module, an R2R network module, a DCDC module and an LED module which are electrically connected in sequence;
    the MCU module comprises an MCU chip; the R2R network module comprises a plurality of R2R networks, and the DCDC module comprises a plurality of DCDC circuits; input terminals of the R2R networks are electrically connected to the MCU chip, and output terminals of the R2R networks are electrically connected to feedback terminals of the corresponding DCDC circuits respectively; output terminals of the DCDC circuits are all electrically connected to the LED module;
    the MCU chip is used for generating digital signals corresponding to different brightness levels and generating, according to values of the digital signals corresponding to different brightness levels, binary codes which are output parallelly to control an on-off state of resistor pairs in the corresponding R2R networks, and adjusting the DCDC circuits to drive an output voltage of the LED module, and stepless change of the output voltage is realized by means of capacitors of the DCDC circuits.

2. The controller for a bathtub lamp according to claim 1, wherein the R2R network comprises a plurality of resistors, and each said resistor has a terminal connected in parallel to the MCU chip as well as a terminal connected to the feedback terminal of the corresponding DCDC circuit.

3. The controller for a bathtub lamp according to claim 1, wherein the DCDC circuit comprises a DCDC chip, a resistor A, a capacitor C, a resistor B, a Schottky diode and an inductor; the resistor A is connected to an enable pin EN of the DCDC chip and is connected to an external power supply after being connected to a drive pin VIN; the inductor is connected to a switch pin SW of the DCDC chip and leads out a voltage output terminal VOUT; one terminal of the capacitor is connected in parallel to the voltage output terminal VOUT, and the other terminal of the capacitor is grounded; an anode of the Schottky diode is connected to a power ground, and a cathode of the Schottky diode is connected in parallel between the switch pin SW and the inductor; the capacitor C is connected between the pin VIN and a pin GND of the DCDC chip and is grounded; and the resistor B is connected to the capacitor and is connected to the output terminal of the corresponding R2R network after being connected to a pin FB of the DCDC chip.

4. The controller for a bathtub lamp according to claim 1, wherein the LED module comprises a drive chip and an LED unit electrically connected to the drive chip, an OUTR pin, an OUTG pin and an OUTB pin are arranged on the drive chip, the LED unit comprises an R-LED, a G-LED and a B-LED which are respectively connected to the OUTR pin, the OUTG pin and the OUTB pin.

5. The controller for a bathtub lamp according to claim 4, wherein the R2R network module comprises three R2R networks, the DCDC module comprises three DCDC circuits, and the three DCDC circuits are connected to the R-LED, the G-LED and the B-LED through the OUTR pin, the OUTG pin and the OUTB pin respectively; the input terminals of the three R2R networks are electrically connected to the MCU chip, and the output terminals of the three R2R networks are electrically connected to the feedback terminals of the DCDC circuits respectively; the MCU chip outputs three digital signal R, G and B corresponding to different brightness levels to respectively control the on-off state of the resistor pairs in the corresponding R2R networks to correspondingly adjust voltages output to the OUTR pin, the OUTG pin and the OUTB pin by the DCDC circuits connected to the R2R networks.

6. The controller for a bathtub lamp according to claim 5, wherein when the R2R network is configured to output 0, the voltage output by the corresponding DCDC circuit is lower than a turn-on voltage of the R-LED, the G-LED or the B-LED connected to the DCDC circuit; when the R2R network is configured to output 1, the voltage output by the corresponding DCDC circuit is greater than the turn-on voltage of the R-LED, the G-LED or the B-LED connected to the DCDC circuit; and when the R2R network is configured to output 2 to N, voltages are superposed correspondingly to be output, wherein N is the number of bits of the R2R network.

7. The controller for a bathtub lamp according to claim 1, wherein a voltage stabilizer for providing a +5 V operating voltage for the MCU chip is connected to a pin VDD of the MCU chip.

8. The controller for a bathtub lamp according to claim 1, wherein a pin VCAP of the MCU chip is connected to a capacitor C2 and is grounded after being connected to a pin VSS.

* * * * *